United States Patent
Park et al.

[11] Patent Number: 5,787,917
[45] Date of Patent: Aug. 4, 1998

[54] AUTOMATIC EARTHQUAKE GAS SHUT-OFF SYSTEM

[76] Inventors: Bong J. Park, 7591 Barbi La., La Palma, Calif. 90623; Il Y. Lee, GA-201 Hyundai Villa, 950-11, Soha2-Dong, Gwang-Myeong, Gyeonggi-Do, Rep. of Korea

[21] Appl. No.: 608,293

[22] Filed: Feb. 28, 1996

[51] Int. Cl.$^6$ .................................................. F16K 17/36
[52] U.S. Cl. ........................................ 137/38; 137/39
[58] Field of Search .............................. 137/38, 39, 45

[56] References Cited

U.S. PATENT DOCUMENTS

| | | |
|---|---|---|
| 2,325,725 | 8/1943 | Wood ........................ 137/38 |
| 3,779,262 | 12/1973 | Manning et al. ............ 137/38 |
| 3,964,504 | 6/1976 | Inhofer ...................... 137/39 |
| 4,098,284 | 7/1978 | Yamada . |
| 4,214,238 | 7/1980 | Adams et al. . |
| 4,297,690 | 10/1981 | Baker . |
| 4,546,660 | 10/1985 | Bujold . |
| 4,689,997 | 9/1987 | Windisch . |
| 4,715,394 | 12/1987 | O'Donnell et al. . |
| 4,833,461 | 5/1989 | Yeager . |
| 4,841,287 | 6/1989 | Flig et al. . |
| 5,143,110 | 9/1992 | Simpson . |
| 5,271,425 | 12/1993 | Swartzlander . |
| 5,418,523 | 5/1995 | Anderson et al. . |

Primary Examiner—Stephen M. Hepperle
Attorney, Agent, or Firm—John K. Park; Law Offices of John K. Park & Associates

[57] ABSTRACT

An automatic earthquake gas shut-off system (11) is provided in two selected versions. The first version of the gas shut-off system (11) includes a spring pendulum (17), a first electronic movement sensor (21), an electrical control relay system (23), an electrical motor (25), and a housing (27). A several improvements to the first version may be made. These improvements may include one or more of the following. The use of a reset switch (61), a combination of a first bevel gear (37) and a second bevel gear (39), a combination of a second electronic movement sensor (53) and a third electronic movement sensor (55), a timer (65), a key (41), a rechargeable battery (67), and an activation switch (63). The second version of the gas shut-off system (11) includes, in addition to the elements of the first version, a pendulum damper (19) which may adjust the receptive frequency of the spring pendulum (17). Either version, along with any combination of the improvements described herein, may be housed in a single housing (27) or separated into one or more detached parts. If the complete gas shut-off system (11) is housed in a single housing (27), then the complete gas shut-off system (11) is easily mounted directly onto the main gas pipe (15) without any modification to the existing main gas pipe (15).

20 Claims, 4 Drawing Sheets

AUTOMATIC EARTHQUAKE GAS SHUT-OFF SYSTEM

BACKGROUND

This invention relates to a new and innovative system of an automatic earthquake gas shut-off system able to automatically close a main gas valve of the main gas pipe to stop the flow of gas into a house or a building.

One of the major hazards following a significant earthquake is the danger of gas explosion and fire as a result from gas leaking from broken gas pipes. Sometimes the damage caused by the earthquake may not appear significant, but if the gas accumulates and explodes due to the gas leak, the damage could be catastrophic and life threatening. The risk of this post-earthquake damage may be minimized with a safety device to automatically shut the main gas pipe during an earthquake. The gas may be turned on again after an inspection of gas pipes is done. A several safety devices which can automatically shut the gas off have been proposed to date. However, most of these devices are commercially impracticable because they require a specially constructed main gas valve which the installation would require a skilled technician. A skilled technician and much effort are required because prior art devices are comprised of many parts, and difficult to install and operate. Moreover, these prior art devices are quite expensive.

For the foregoing reasons, there is a need for a new and innovative system of an automatic earthquake gas shut-off system able to automatically close a main gas valve of the main gas pipe that is easy to install, simple to operate, and inexpensive.

SUMMARY

The present invention is directed to a new and innovative system of an automatic earthquake gas shut-off system able to automatically close a main gas valve of the main gas pipe to stop the flow of gas into a house or a building. This present invention eliminates the need of a specially constructed main gas valve requiring a skilled technician to install. Moreover, this invention eliminates multiplicity of part, making the invention cost efficient.

The first version of the present invention comprises a spring pendulum, a first electronic movement sensor, an electrical control system having at least one electrical control relay, an electrical motor, and housing to house each of the part specified. The spring pendulum has two ends, wherein one end of the pendulum is securely attached to a housing and the other end of the pendulum is cantilevered so this second end is free to vibrate upon an earthquake.

Oppositely positioned and spaced apart from the free end of the pendulum is an electronic movement sensor. This electronic movement sensor is to detect the movement of the free end of the pendulum and to send forth a sensor signal indicating the movement of the free end of the pendulum. The sensor signal is then carried to an electrical control relay system, whereupon at least one electrical control relay will send forth an electrical control relay signal to an electrical motor.

The electrical motor, upon the receipt of the control relay signal, will be activated to trigger a gas shut-off means for shutting off the gas to prevent the gas leak and to reduce the risk of catastrophic and life threatening gas explosion. The housing, one or more, will enclose one or more of the parts described herein.

In this version of the invention, the efficiency and the effectiveness of the automatic earthquake gas shut-off system may be improved by having a reset switch. This reset switch is wired to the electrical control system so the user may be able to reverse the operation of the control system so the main gas valve would reset to the open position. This feature is very useful in that, after an earthquake and the completion of an inspection, the user of the invention would easily be able to reset the invention to pre-earthquake position.

In this version of the invention, the efficiency and the effectiveness of the automatic earthquake gas shut-off system may be improved by using a pair of bevel gears, wherein the axis of rotation of two bevel gears will intersect perpendicularly to form a ninety degree angle. The first bevel gear is rotatably attached to the electrical motor and the second bevel gear is rotatably attached to the first bevel gear so the rotation of the motor is efficiently transferred to the gas shut-off means.

The automatic earthquake gas shut-off system may further comprise two additional electronic movement sensors to determine when the main gas valve is completely open or completely closed. This detection may be done by having the second electronic movement sensor and the third electronic movement sensor positioned ninety degrees apart to sense that the second bevel gear having an axle has turned ninety degrees from the original pre-earthquake position or from the post-earthquake position. The axle of the second bevel gear has three parts: a first axle end, a second axle end, and a cylindrical wall. The first axle end is attached to the second bevel gear and the second axle end is attached to the gas shut-off means.

The detection of the movement of the bevel gear is accomplished because the axle of the second bevel gear has a first post and a second post mounted on the cylindrical wall of the axle. Because the first post and the second post is oppositely positioned and spaced apart from the second electronic movement sensor and the third electronic movement sensor, respectively, in the original pre-earthquake position, when the axle completes its ninety degree turn, the movement of either the first post or the second post is readily detected and is used by the either the second electronic movement sensor and the third electronic movement sensor. Having this feature would ensure that the main gas valve is securely closed or securely opened as desired.

As an added security, the gas shut-off means may further comprise a timer. This timer may be automatically activated soon after the movement of the spring pendulum initiates the gas shut-off system to further tighten the valve to the desired position. This timer may be activated intermittently a plurality of times so that the gas shut-off means further tightens the main gas valve of the main gas pipe several times to ensure that the main gas valve is fully closed, and that any after shocks have not partially breached the secured closed position.

A specially designed key that fits snugly over the main gas valve turn knob of the main gas pipe will further improve the operation of the gas shut-off system. This specially designed key would extend forth from the second axle end.

Moreover, a rechargeable battery may be attached to the electrical control system. The rechargeable battery would provide self sufficient power to the gas shut-off system when a commercial electricity supply is cut off due to an earthquake.

Moreover, an activation switch to activate the gas shut-off system in order to close the main gas valve of the main gas pipe without an earthquake is an additional improvement. This feature would allow the user to simply activate the system to close the valve without an earthquake. This activation switch to activate the gas shut-off system to close the valve may be combined with the reset switch to reverse the gas shut-off system to open the valve to be a single switch for added simplicity.

Furthermore, because of the simplicity of the invention and the size of the invention, the gas shut-off system may be mounted directly on the main gas pipe. The gas shut-off system would be easily mounted and dismounted. Even a locking device may be necessary in order to prevent a theft of the device, because the removal would be so simple.

The second version of the invention is different from the first version in that, in addition to the first version parts and features, the second version also comprises a pendulum damper. The pendulum damper has two ends: a first damper end and a second damper end. The first damper end is movably attached to the spring pendulum and the second damper end is attached to the housing. This pendulum damper, although simple in design, enables the entire gas shut-off system to be a predetermined frequency sensitive. The gas shut-off system may now be preset to differentiate the earthquake frequencies from other frequencies, such as someone hitting the pipe with a hammer.

In this second version of the invention, each of the improvements aforementioned may be also added to the second version of the invention, with the same effect and the same benefits.

One of the advantages in using this invention is the simplicity. Because the entire gas shut-off system may be easily packaged in a single unit, there is no need to mount a several different devices. Moreover, because the gas shut-off system is simple, either version of the gas shut-off system can be easily be installed on to the main gas pipe. There is no special modification to be added in to the existing gas pipe. There is no need to take the existing gas pipe apart. The installer would simply attach the gas shut-off system directly on to and over the main gas valve, generally using a set of U-shaped clamps. Moreover, if there is a need to remove the gas shut-off system off the gas pipe, then it is also very simple. Simply remove the set of U-shaped clamps.

Another advantage of the invention is that the cost of the gas shut-off system is low. This is especially true if the installation cost of the gas shut-off system is included in the total cost.

Another advantage of the invention is that because a physical contact between the sensor and the pendulum end is not required, the gas shut-off system does not have to be mounted or placed on a flat/level ground. Moreover, because a physical contact between the sensor and the pendulum end is not required, it is believed that this invention reduces the risk of the gas shut-off system falsely activating or the gas shut-off system inadvertently not activating during an earthquake.

Another advantage of the invention is that when the gas shut-off system has either the activation switch or the reset switch, or both switches, the closing or opening of the main gas valve would be as simple as pushing on the respective switch. This would mean that even when any gas work needs to be done down from the main gas valve, such as inside a house for a kitchen modification, the main gas valve can easily be closed or opened depending on the need.

DRAWINGS

These and other features, aspects, and advantages of the present invention will become better understood with regard to the following description, appended claims, and accompanying drawings where:

DESCRIPTION

With reference to the figures, an embodiment of the automatic earthquake gas shut-off system 11 able to automatically close a main gas valve 13 of a main gas pipe 15 to stop the flow of gas according to the present invention is illustrated. The figures illustrate this embodiment of the present invention.

Figure 1:
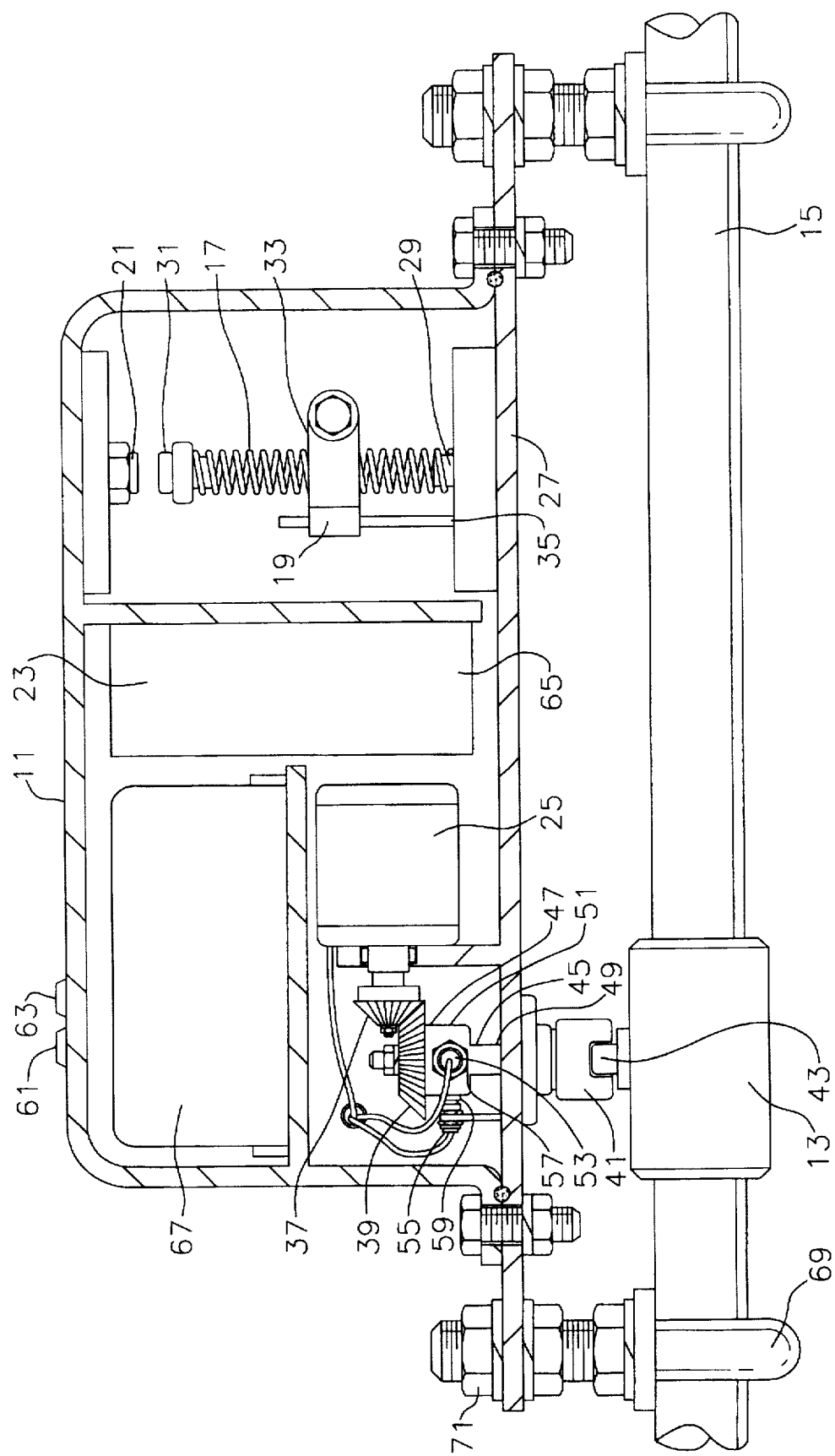
FIG. 1 is a front view of an embodiment of the automatic earthquake gas shut-off system as described in the second version of the invention.

FIG. 1 shows an embodiment of the automatic earthquake gas shut-off system 11. This embodiment comprises of a spring pendulum 17, a pendulum damper 19, a first electronic movement sensor 21, an electrical control system 23 which has at least one electrical control relay, an electrical motor 25, and housing 27. The housing 27 encloses and neatly packages the present embodiment of the automatic earthquake gas shut-off system 11.

The spring pendulum 17 has with a first pendulum end 29 and a second pendulum end 31. The first pendulum end 29 is attached securely to the housing 27 and the second pendulum end 31 is cantilevered so the second pendulum end 31 is free to vibrate upon an earthquake.

Oppositely positioned and spaced apart from the second pendulum end 31 is a first electronic movement sensor 21. The first electronic movement sensor 21 detects the movement of the second pendulum end 31. One advantage of the invention is that because a physical contact between the first electronic movement sensor 21 and the second pendulum end 31 is not required, the gas shut-off system 11 does not have to be mounted or placed on a flat/level ground. Moreover, because a physical contact between the first electronic movement sensor 21 and the second pendulum end 31 is not required, it is believed that this invention reduces the risk of the gas shut-off system 11 falsely activating or inadvertently not activating during an earthquake.

Fixedly attached to the housing 27 and adjustably attached to the spring pendulum 17 is a pendulum damper 19 with a first damper end 33 and a second damper end 35. The first damper end 33 is adjustably attached to the spring pendulum 17 and the second damper end 35 is fixedly attached to the housing 27. The pendulum damper 19, although simple in design, enables the entire gas shut-off system 11 to be a predetermined frequency sensitive. The gas shut-off system 11 may now be preset to differentiate the earthquake frequencies from other frequencies, such as someone hitting the main gas pipe 15 with a hammer.

Once the first electronic movement sensor 21 detects the movement of the second pendulum end 31, the first electronic movement sensor 21 sends forth a sensor signal indicating the movement of the second pendulum end 31. The sensor signal is then carried to an electrical control system 23, whereupon the electrical control system 23 will send forth an electrical control relay signal to an electrical motor 25.

The electrical motor 25, upon the receipt of the control relay signal, will be activated to trigger a gas shut-off means for shutting off the gas to prevent the gas leak and to reduce the risk of catastrophic and life threatening gas explosion.

A preferred version of the automatic earthquake gas shut-off system 11 would also comprise of a pair of bevel gears as a part of the means for shutting off the gas. As shown in the figure, a first bevel gear 37 is rotatably attached to the electrical motor 25 and a second bevel gear 39 is rotatably attached to the first bevel gear 37, so the rotation of the motor 25 is efficiently transferred to the gas shut-off means. The high speed rotation of the electrical motor 25 is reduced by the combination of the first bevel gear 37 and the second bevel gear 39, while the torque of the electrical motor 25 is increased by the use of the first bevel gear 37 and the second bevel gear 39. Moreover, the use of the first bevel gear 37 and the second bevel gear 39 is recommended because the rotation of the motor 25 is conveniently and efficiently perpendicularly transferred to a specially designed key 41 that fits snugly over the main gas valve 13 turn knob 43 of the main gas pipe 15.

The key 41 would extend forth from an axle 45 of the second bevel gear 39 attached to the second bevel gear 39. The axle 45 of the second bevel gear 39 comprises of three parts: a first axle end 47, a second axle end 49, and a cylindrical wall 51. The first axle end 47 is attached to the second bevel gear 39 and the second axle end 49 is attached to the key 41.

The automatic earthquake gas shut-off system 11 may further comprise two additional electronic movement sensors to determine when the main gas valve 13 is completely opened or completely closed. This detection may be done by having a second electronic movement sensor 53 and a third electronic movement sensor 55 positioned ninety degrees apart to detect that the second bevel gear 39 has turned ninety degrees from the original pre-earthquake position or from the post-earthquake position.

The detection of the movement of the bevel gear 39 may be enhanced by the use of a first post 57 (not shown for clarity, but is located directly under the second electronic movement sensor 53) and a second post 59 mounted on the cylindrical wall 51 of the axle 45. Because the axle 45 is smoothly cylindrical, the rotation of the axle 45 may not be readily detected by the second electronic movement sensor 53 or third electronic movement sensor 55. Therefore, the use of the first post 57 and the second post 59 gives the second electronic movement sensor 53 and third electronic movement sensor 55 a set of reference points.

The first post 57 and the second post 59 is oppositely positioned and spaced apart from the second electronic movement sensor 53 and the third electronic movement sensor 55, respectively, in the original pre-earthquake position. When the axle 45 completes its ninety degree turn, the movement of either the first post 57 or the second post 59 is readily detected and is used by the either the second electronic movement sensor 53 or the third electronic movement sensor 55. Having this feature would ensure that the main gas valve 13 is securely closed or securely opened as desired.

The efficiency and the effectiveness of the automatic earthquake gas shut-off system 11 may be improved by having a reset switch 61. This reset switch 61 is wired to the electrical control system 23 so the user may be able to reverse the operation of the electrical control system 23 so the main gas valve 13 would reset to the open position when needed. This feature is very useful in that, after an earthquake and the completion of inspection, the user of the invention would easily be able to reset the invention to pre-earthquake position.

Another improvement to the gas shut-off system 11 may be an addition of an activation switch 63 to activate the gas shut-off system 11 in order to close the main gas valve 13 of the main gas pipe 15 without an earthquake. This feature would allow the user to simply activate the gas shut-off system 11 to close the valve 13 without an earthquake. This activation switch 63 to activate the gas shut-off system 11 to close the valve 13 may be combined with the reset switch 61 to reverse the gas shut-off system 11 to open the valve 13 to be a single switch for added simplicity.

As an added security, the gas shut-off system 11 may further comprise a timer 65. This timer 65 may be automatically activated soon after the movement of the spring pendulum 17 initiates the gas shut-off system 11 to further tighten the valve 13 to the desired position. This timer 65 may then be activated intermittently a plurality of times so that the gas shut-off system 11 further tightens the main gas valve 13 of the main gas pipe 15 several times repeatedly to ensure that the main gas valve 13 is fully closed, and that any after shocks have not partially breached the secured closed position.

Moreover, a rechargeable battery 67 may be attached to the electrical control system 11. The rechargeable battery 67 would provide self sufficient power to the gas shut-off system 11 when a commercial electricity supply is cut off due to an earthquake.

Furthermore, because of the simplicity of the invention and the size of the invention, the gas shut-off system 11 may be mounted directly on the main gas pipe 15. The mounting of the gas shut-off system 11 may be done by using a pair of U-shaped bolts 69 and standard nuts 71 as shown. The gas shut-off system 11 would then be easily mounted and dismounted.

Figure 2:
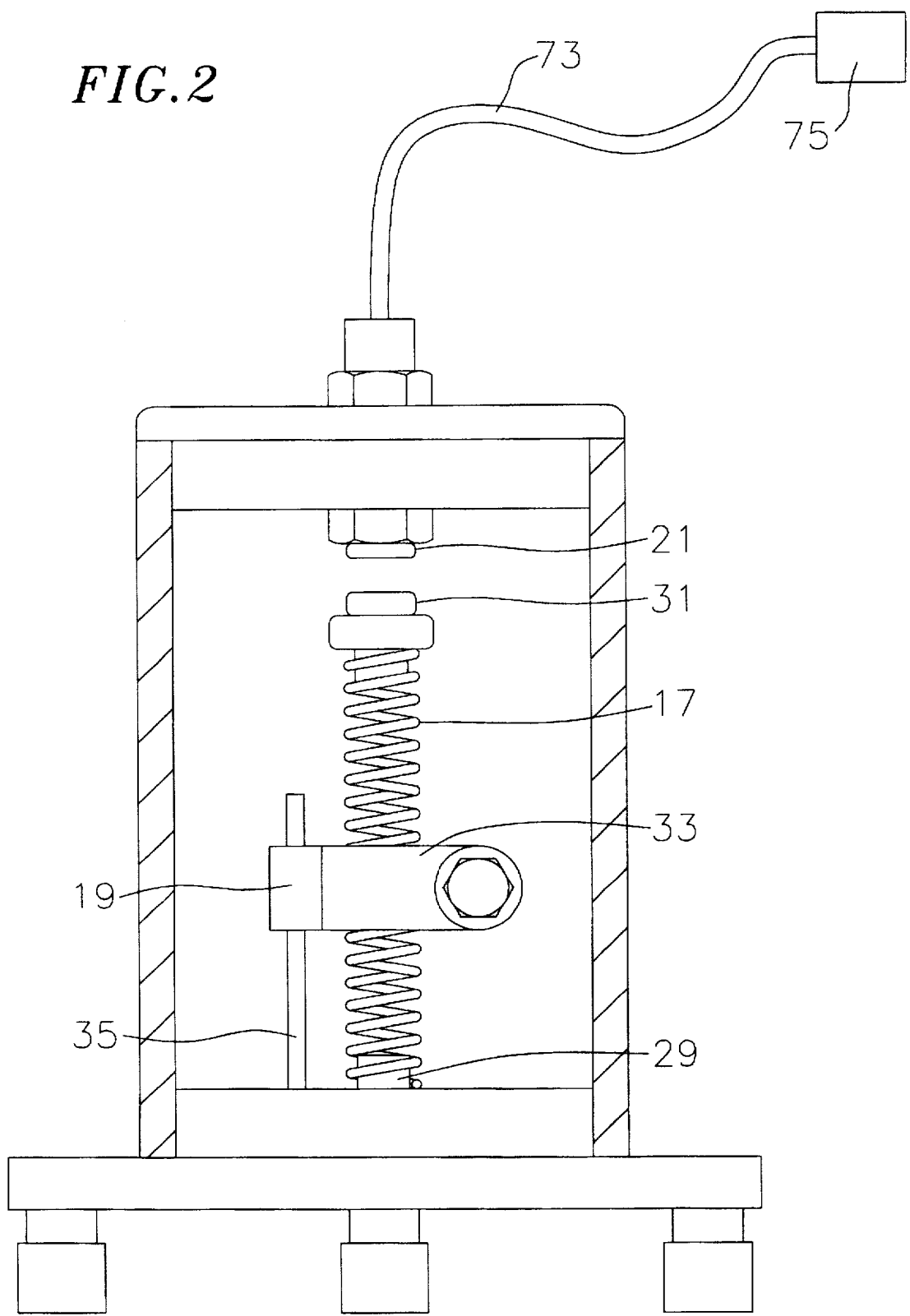
FIG. 2 is a front view of the spring pendulum.

FIG. 2 shows a front view of the spring pendulum 17 by itself. As shown, this spring pendulum 17 may be packaged by itself, different from as shown in FIG. 1. When the spring pendulum 17 is placed by itself, it is recommended that the spring pendulum 17 is placed on a flat and stable ground. An electrical cable 73 and an electrical connector 75 may be used to carry the sensor signal indicating the movement of the second pendulum end 31 to the electrical control system 23.

Figure 3:
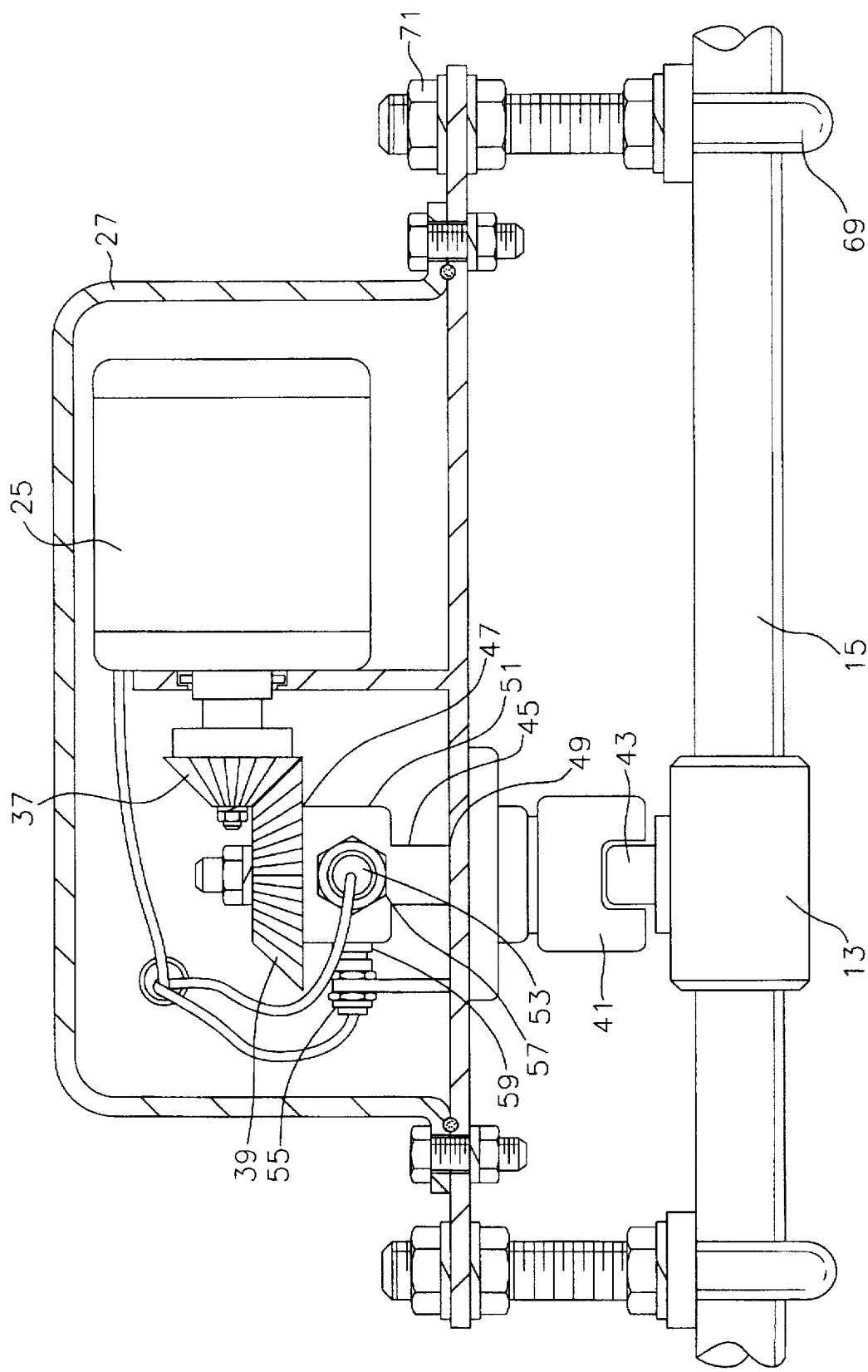
FIG. 3 is a front view of the electrical motor having a gas shut-off means for shutting off the gas.

FIG. 3 is a front view of the electrical motor 25 attached to the key 41 for shutting off the gas. This electrical motor 25 may be packaged by itself, different from as shown in FIG. 1. When the electrical motor 25 is separately mounted, the electrical motor 25 is wired to the electrical control system 23, and the electrical control system 23 is wired to the spring pendulum 17. The installation of the gas shut-off system 11 as separate parts is recommended when the user wants to maintain higher security in the control of the gas shut-off system 11.

Figure 4:
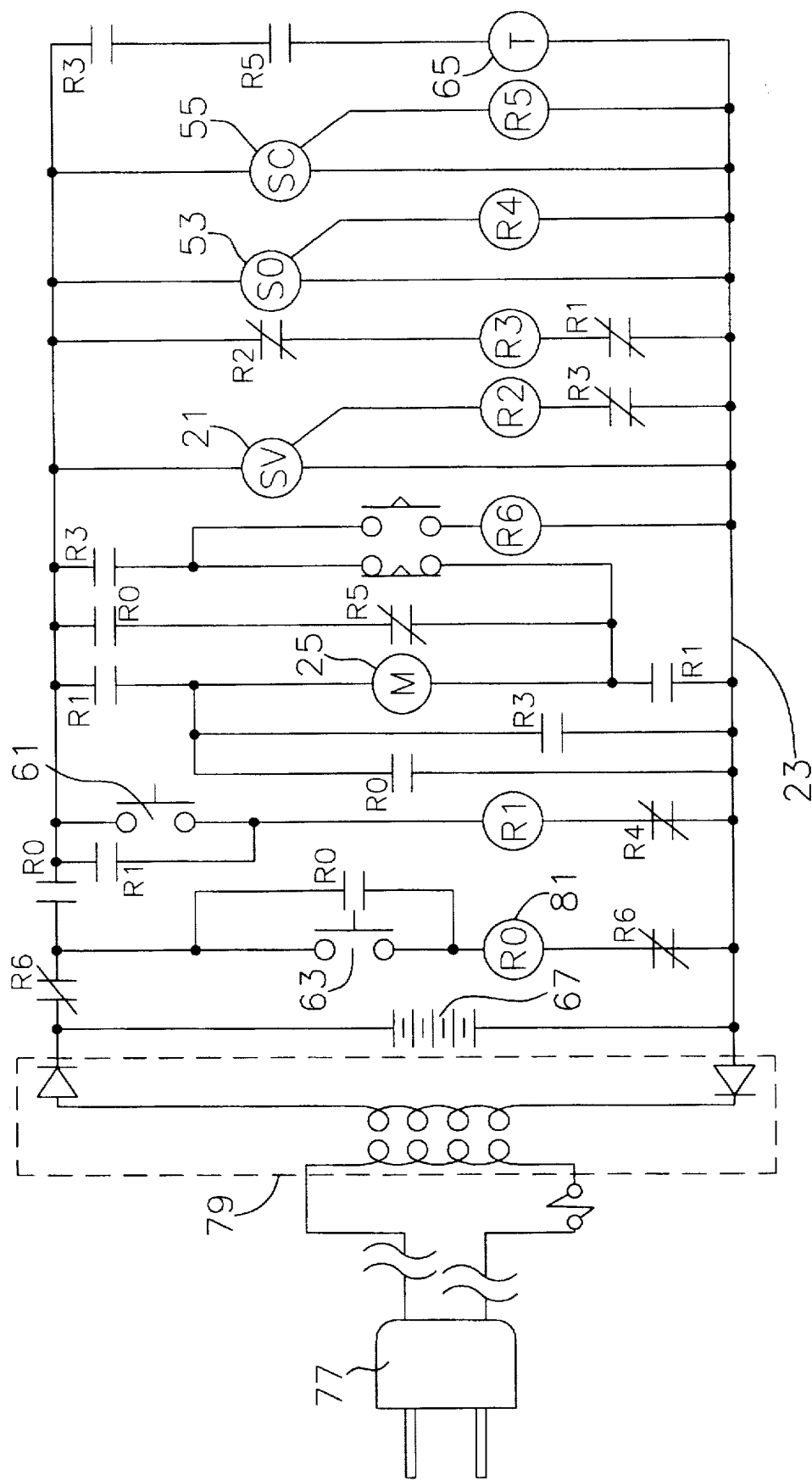
FIG. 4 is an electrical schematic of the electrical control system.

FIG. 4 is a simple version of an electrical schematic of the electrical control system 11. An electrical plug 77 may be used to receive a common household current to the gas shut-off system 11. The household current is then converted into a ready and available power source by a transformer 79. The converted power is stored in the rechargeable battery 67.

When the first electronic movement sensor 21 (identified by "SV") detects the movement of the second pendulum end 31, the first electronic movement sensor 21 sends forth a sensor signal indicating the movement of the second pendulum end 31. The sensor signal is then carried to one or more electrical control relays S1 (identified by "R" with a circle around the identifier), whereupon the electrical control relays 81 will send forth an electrical control relay signal to an electrical motor 25 (identified by "M"). The electrical motor 25, upon the receipt of the control relay signal, will be activated to trigger the gas shut-off means for shutting off gas.

The automatic earthquake gas shut-off system 11 may further comprise the second electronic movement sensor 53 (identified by "SO") to detect that the main gas valve is in the open position, and the third electronic movement sensor 55 (identified by "SC") to detect that the main gas valve is in the closed position. The second electronic movement sensor 53 and the third electronic movement sensor 55 are also controlled within the electrical control system 23 (represented by the entire schematics).

As mentioned earlier, the efficiency and the effectiveness of the automatic earthquake gas shut-off system 11 may be improved by having a reset switch 61. This reset switch 61 is wired to the electrical control system 23 so the user may be able to reverse the operation of the electrical control system 23 so the main gas valve 13 would reset to the open position when needed.

Another improvement to the gas shut-off system 11 may be an addition of an activation switch 63 to activate the gas shut-off system 11 in order to close the main gas valve 13 of the main gas pipe 15 without an earthquake. This feature would allow the user to simply activate the gas shut-off system 11 to close the valve 13 without an earthquake. This activation switch 63 to activate the gas shut-off system 11 to close the valve 13 may be combined with the reset switch 61 to reverse the gas shut-off system 11 to open the valve 13 to be a single switch for added simplicity.

As an added effectiveness measure, the gas shut-off system 11 may further comprise a timer 65 (identified by "T"). This timer 65 may be programmed to be activated soon after the movement of the spring pendulum 17 initiates the gas shut-off system 11 to further tighten the valve 13 to the desired position.

The most preferred version of the invention is the gas shut-off system 11 comprising of all the improvements specified herein, and that the complete gas shut-off system 11 is contained in one housing 27 to be directly mounted on the main gas pipe 15. The gas shut-off system 11 would be easily mounted and dismounted.

One of the advantages in using this invention is the simplicity. Because the entire gas shut-off system 11 may be easily packaged in a single unit, there is no need to mount a several different devices. Moreover, because the gas shut-off system 11 is simple, either version of the gas shut-off system 11 can be easily be installed on to the main gas pipe 15. There is no special modification to be added to the existing gas pipe. There is no need to take the existing gas pipe apart. The installer would simply attach the gas shut-off system 11 directly on to and over the main gas valve 15, generally using a set of U-shaped clamps 69. Moreover, if there is a need to uninstall the gas shut-off system 11 off the gas pipe, then it is also very simple. Simply remove the set of U-shaped clamps 69.

Another advantage of the invention is that the cost of the gas shut-off system 11 is low. This is especially true if the installation cost of the gas shut-off system 11 is included in the total cost, and the total cost of this invention is compared to the total cost of other available inventions.

Another advantage of the invention is that because a physical contact between the first electronic movement sensor 21 and the second pendulum end 31 is not required, the gas shut-off system 11 does not have to be mounted or placed on a flat/level ground. Moreover, because a physical contact between the first electronic movement sensor 21 and the second pendulum end 31 is not required, it is believed that this invention reduces the risk of the gas shut-off system 11 falsely activating or the gas shut-off system 11 inadvertently not activating during an earthquake.

Another advantage of the invention is that when the gas shut-off system 11 has either the activation switch 63 or the reset switch 61, or both switches, the closing or opening of the main gas valve 13 would be as simple as pushing the respective switch. This would mean that even when a gas related work needs to be done down from the main gas valve 13, such as inside a house for a kitchen modification, the main gas valve 13 can easily be closed or opened depending on the need.

Although the present invention has been described in considerable detail with reference to certain preferred versions thereof, other versions are possible. For example the gas shut-off system 11 may be mounted on a rotatabe hinge so the gas shut-off system 11 may be able to provide a simulated flat mount for the spring pendulum 17, even when the main gas valve 13 of the main gas pipe 15 is not horizontally positioned. Such a rotatable hinge mount for the gas shut-off system 11 may be done in two directions to better accommodate all configurations of the main gas valve 13 of the main gas pipe 15. Therefore, the spirit and the scope of the appended claims should not be limited to the description of the preferred versions contained herein.

What we claim is:

1. An automatic earthquake gas shut-off system able to automatically close a main gas valve of a main gas pipe to stop the flow of gas comprising:

a) a housing;
  b) a spring pendulum with a first pendulum end and a second pendulum end wherein the first pendulum end is attached securely to the housing;
  c) a first electronic movement sensor oppositely positioned and spaced apart from the second pendulum end, wherein the first electronic movement sensor will be able to detect the movement of the second pendulum end and send forth a first sensor signal indicating any movement of the second pendulum end;
  d) an electrical control relay attached to the first electronic movement sensor to receive the first sensor signal and send forth a control relay signal; and
  e) an electrical motor having a gas shut-off means for shutting off the gas, wherein the electrical motor is attached to the electrical control relay, and wherein the electrical motor receives the control relay signal to activate the gas shut-off means.

2. The automatic earthquake gas shut-off system of claim 1 further comprising a reset switch wherein the gas shut-off means is reversed, wherein the reset switch is attached to the electrical control relay.

3. The automatic earthquake gas shut-off system of claim 2 wherein the gas shut-off means further comprising a first bevel gear having a first axis of rotation and a second bevel gear having a second axis of rotation, wherein the first bevel gear is rotatably attached to the electrical motor and the second bevel gear is rotatably attached to the first bevel gear so the first axis of rotation and the second axis of rotation intersect perpendicularly.

4. The automatic earthquake gas shut-off system of claim 3 wherein the gas shut-off means further comprising an axle of the second bevel gear having a first axle end, a second axle end, and a cylindrical wall, wherein the first axle end is attached to the second bevel gear, wherein the cylindrical wall having a first post and a second post; and wherein the gas shut-off means further comprising a second electronic movement sensor oppositely positioned and spaced apart from the first post of the second bevel gear, and a third electronic movement sensor oppositely positioned and spaced apart from the second post of the second bevel gear when the main gas valve of the main gas pipe is in an open position.

5. The automatic earthquake gas shut-off system of claim 4 wherein the gas shut-off means further comprising a timer, wherein the timer is activated soon after the movement of the spring pendulum initiates the automatic earthquake gas shut-off system to close the main gas valve of the main gas pipe, and wherein the timer is activated intermittently a plurality of times so that the gas shut-off means further tightens the main gas valve of the main gas pipe to ensure that the main gas valve is fully closed.

6. The automatic earthquake gas shut-off system of claim 5 wherein the gas shut-off means further comprising a key designed to fit over the main gas valve of the main gas pipe, wherein the key is attached to the second axle end of the second bevel gear.

7. The automatic earthquake gas shut-off system of claim 6 further comprising a rechargeable battery attached to the electrical control relay to provide self sufficient power to the gas shut-off system when a commercial electricity supply is cut off due to an earthquake.

8. The automatic earthquake gas shut-off system of claim 7 further comprising an activation switch to activate the gas shut-off system in order to close the main gas valve of the main gas pipe without an earthquake.

9. The automatic earthquake gas shut-off system of claim 8 wherein the reset switch and the activation switch is combined in a single switch device.

10. The automatic earthquake gas shut-off system of claim 9 wherein the gas shut-off system is mounted directly on the main gas pipe.

11. An automatic earthquake gas shut-off system able to automatically close a main gas valve of a main gas pipe to stop the flow of gas comprising:

a) a housing;

b) a spring pendulum with a first pendulum end and a second pendulum end wherein the first pendulum end is attached securely to the housing;

c) a pendulum damper with a first damper end and a second damper end wherein the first damper end is adjustably attached to the spring pendulum and the second damper end is attached to the housing;

d) a first electronic movement sensor oppositely positioned and spaced apart from the second pendulum end, wherein the first electronic movement sensor will be able to detect the movement of the second pendulum end and send forth a first sensor signal indicating any movement of the second pendulum end;

e) an electrical control relay attached to the first electronic movement sensor to receive the first sensor signal and send forth a control relay signal; and f) an electrical motor having a gas shut-off means for shutting off the gas, wherein the electrical motor is attached to the electrical control relay, and wherein the electrical motor receives the control relay signal to activate the gas shut-off means.

12. The automatic earthquake gas shut-off system of claim 11 further comprising a reset switch wherein the gas shut-off means is reversed, wherein the reset switch is attached to the electrical control relay.

13. The automatic earthquake gas shut-off system of claim 12 wherein the gas shut-off means further comprising a first bevel gear having a first axis of rotation and a second bevel gear having a second axis of rotation, wherein the first bevel gear is rotatably attached to the electrical motor and the second bevel gear is rotatably attached to the first bevel gear so the first axis of rotation and the second axis of rotation intersect perpendicularly.

14. The automatic earthquake gas shut-off system of claim 13 wherein the gas shut-off means further comprising an axle of the second bevel gear having a first axle end, a second axle end, and a cylindrical wall, wherein the first axle end is attached to the second bevel gear, wherein the cylindrical wall having a first post and a second post; and wherein the gas shut-off means further comprising a second electronic movement sensor oppositely positioned and spaced apart from the first post of the second bevel gear, and a third electronic movement sensor oppositely positioned and spaced apart from the second post of the second bevel gear when the main gas valve of the main gas pipe is in an open position.

15. The automatic earthquake gas shut-off system of claim 14 wherein the gas shut-off means further comprising a timer, wherein the timer is activated soon after the movement of the spring pendulum initiates the automatic earthquake gas shut-off system to close the main gas valve of the main gas pipe, and wherein the timer is activated intermittently a plurality of times so that the gas shut-off means further tightens the main gas valve of the main gas pipe to ensure that the main gas valve is fully closed.

16. The automatic earthquake gas shut-off system of claim 15 wherein the gas shut-off means further comprising a key designed to fit over the main gas valve of the main gas pipe, wherein the key is attached to the second axle end of the second bevel gear.

17. The automatic earthquake gas shut-off system of claim 16 further comprising a rechargeable battery attached to the electrical control relay to provide self sufficient power to the gas shut-off system when a commercial electricity supply is cut off due to an earthquake.

18. The automatic earthquake gas shut-off system of claim 17 further comprising an activation switch to activate the gas shut-off system in order to close the main gas valve of the main gas pipe without an earthquake.

19. The automatic earthquake gas shut-off system of claim 18 wherein the reset switch and the activation switch is combined in a single switch device.

20. The automatic earthquake gas shut-off system of claim 19 wherein the gas shut-off system is mounted directly on the main gas pipe.

* * * * *